Dec. 10, 1935.  N. R. BROWNYER  2,023,756
CAR TRUCK
Filed April 29, 1932   4 Sheets-Sheet 2
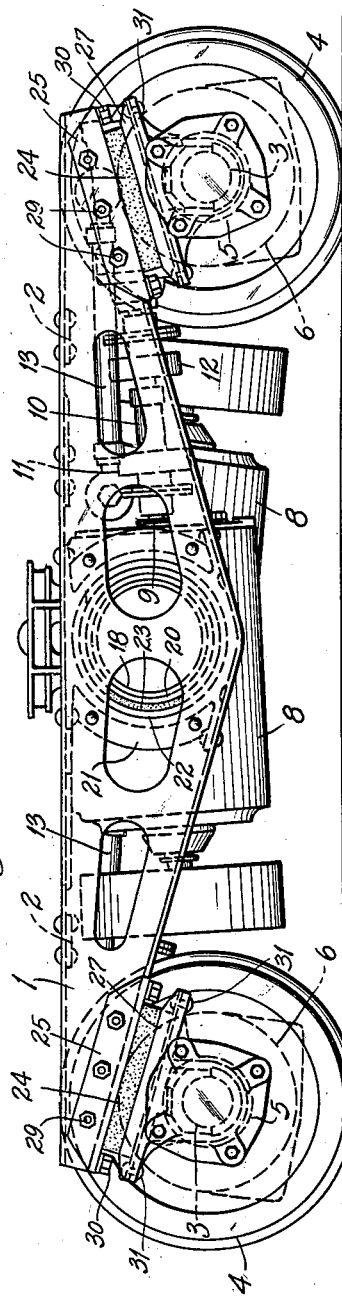
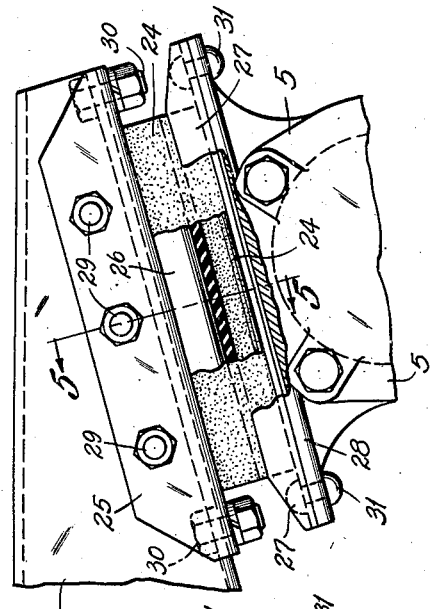
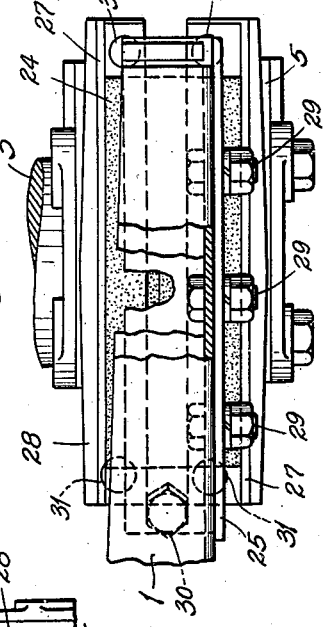
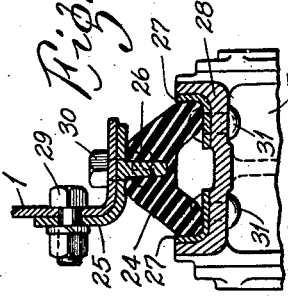
INVENTOR:
N. R. Brownyer
HIS ATTORNEYS

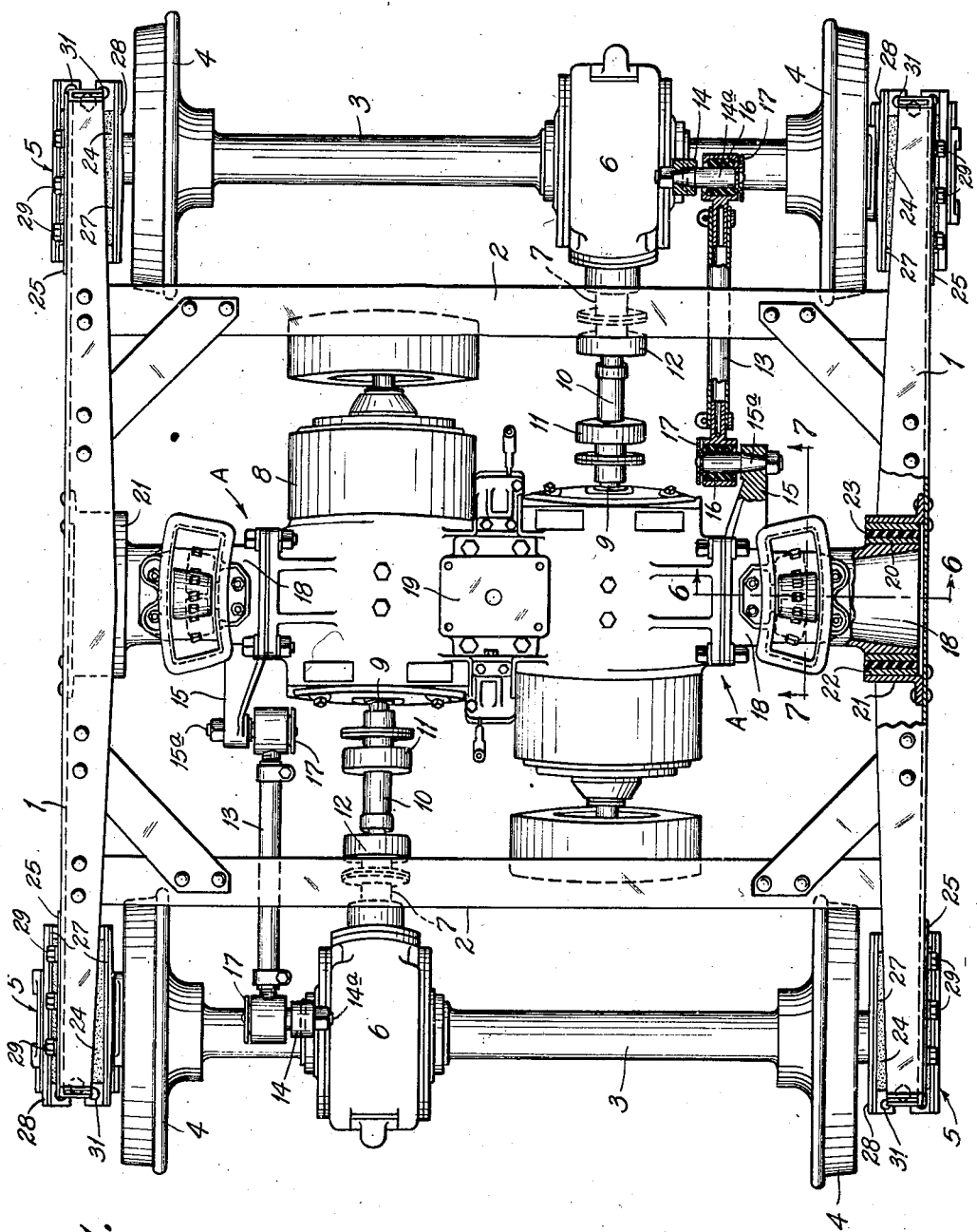

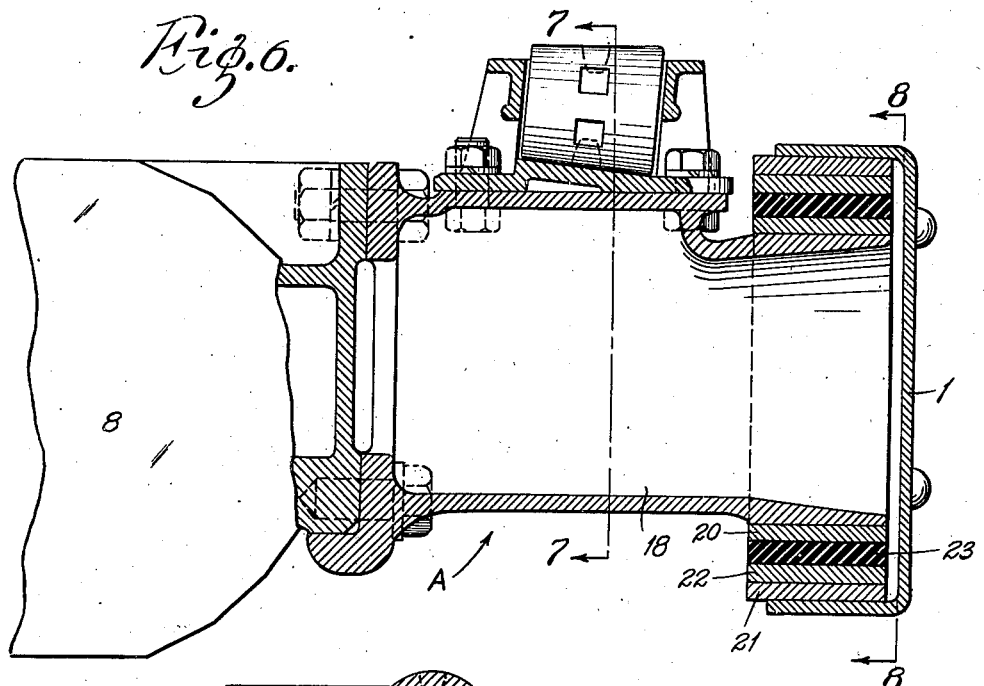
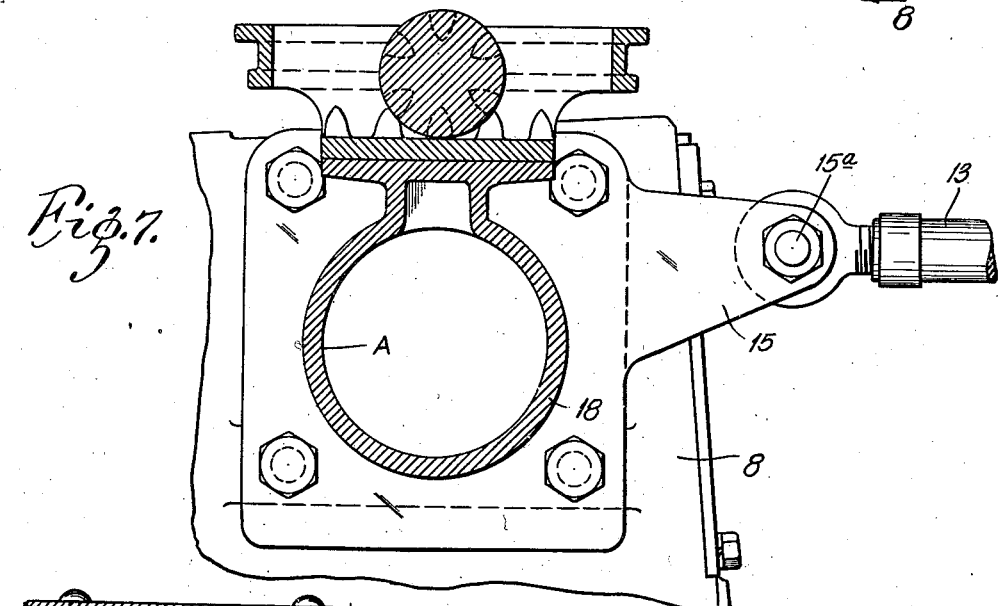
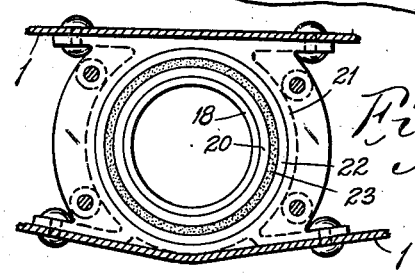

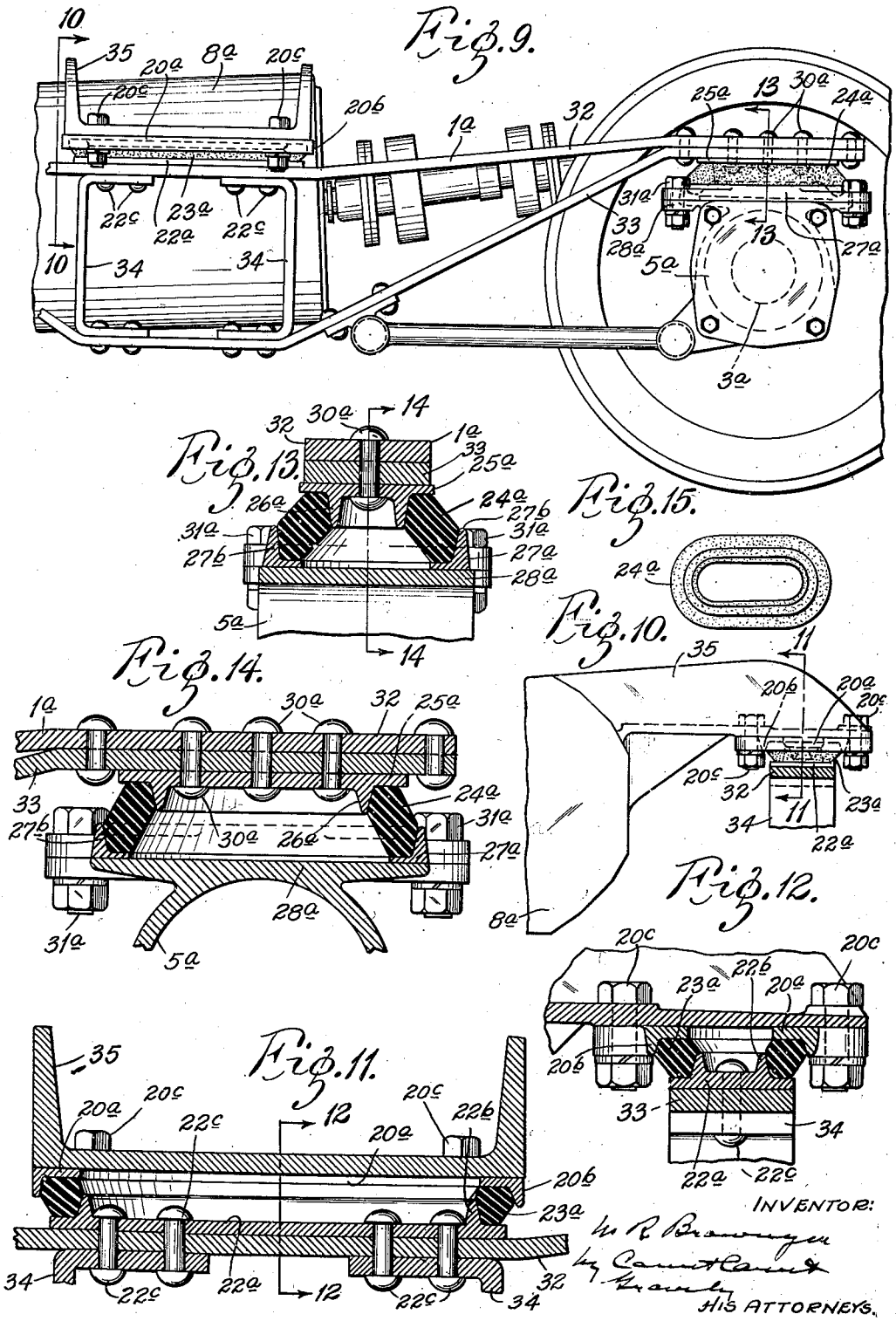

Patented Dec. 10, 1935

2,023,756

UNITED STATES PATENT OFFICE 2,023,756

CAR TRUCK

Nelson R. Brownyer, Detroit, Mich., assignor to The Timken-Detroit Axle Company, Detroit, Mich., a corporation of Ohio Application April 29, 1932, Serial No. 608,165

26 Claims. (Cl. 105—182)

This invention relates to car trucks, particularly street car trucks. It has for its principal object to devise a truck that will minimize jarring and jolting and deaden noise without the use of metallic springs, that will maintain the car body at substantially the same level under all loads, that will take care of the driving and braking torque in the gear housings and that will embody other advantages hereinafter appearing. The invention consists in the car truck and in the construction, combinations and arrangements of parts hereinafter described and claimed.

In the accompanying drawings, which form part of this specification and wherein like symbols refer to like parts wherever they occur, Fig. 1 is a plan view of an electrical car truck conforming to my invention, Fig. 2 is a side elevation of said truck, Fig. 3 is a fragmentary plan view of the end portion of one of the truck side frames and the portions of the axle and journal box located adjacent thereto, Fig. 4 is a fragmentary side view of one end of said truck, Fig. 5 is a fragmentary cross-section on the line 5—5 in Fig. 4, Fig. 6 is a vertical transverse section through one side of the truck at the bolster, Fig. 7 is a vertical section on the line 7—7 in Fig. 6, Fig. 8 is a vertical section on the line 8—8 in Fig. 6, Fig. 9 is a side elevation of an electric car truck of modified construction, Fig. 10 is a vertical section on the line 10—10 in Fig. 9, Fig. 11 is a vertical cross-section on the line 11—11 in Fig. 10, Fig. 12 is a vertical cross-section on the line 12—12 in Fig. 11, Fig. 13 is a vertical cross-section on the line 13—13 in Fig. 9, Fig. 14 is a vertical cross-section on the line 14—14 in Fig. 13; and Fig. 15 is a plan view of one of the cushioning and connecting members used between the ends of the truck side frames and the journal boxes.

Referring to Sheets 1 to 3, inclusive, of the accompanying drawings, my invention is shown in connection with an electrical car truck comprising side frames 1 connected together about midway of their length by a bolster A and adjacent to their ends by cross members 2. It also comprises axles 3 which are provided with wheels 4 and have their journals located outside of said wheels and enclosed within suitable journal boxes 5. Each truck side frame 1 is preferably made in a single piece that is flanged inwardly at both top and bottom and decreases in depth from its middle towards its ends, which are supported on and secured to the journal boxes 5 in a manner hereinafter described. Each axle 3 has a housing or casing 6 journaled thereon adapted to enclose suitable gearing (not shown) which is driven by a propeller shaft 7 operatively connected to a driving motor 8.

The electric motors 8 are arranged side by side about midway between the two axles 3 of the truck with their shafts 9 extending longitudinally of the truck, one shaft being operatively connected to the front axle and the other being operatively connected to the rear axle. The driving connections comprise a short telescoping transmission shaft 10 coupled at one end to the armature shaft 9 by means of one universal joint 11 and coupled at its other end to the propeller shaft 7 by means of a second universal joint 12. The tendency for each gear housing 6 to rotate on its supporting axle due to the torsional forces in said housing is resisted by means of a torque rod 13. Each torque rod 13 is connected at one end to a bracket 14 on the gear housing on one axle and at its opposite end to a bracket 15 on the truck bolster A. As shown in the drawings, each torque rod 13 is secured to the gear housing bracket 14 by means of a horizontal stud 14a and to the bolster bracket 15 by means of a similar horizontal stud 15a. Each end of a torque rod is provided with an opening adapted to receive the supporting stud therefor; and an annular sleeve 16 of rubber or analogous material is interposed between said stud and the opening therefor and is held in said opening by means of a circular plate 17 that is riveted to the end of said stud. By this arrangement, the rubber sleeves form cushion connections which serve to deaden noise and vibration and permit limited universal movement of the torque rods and the parts cooperating therewith and also tend to return the parts to normal position.

In the construction illustrated in the drawings, the truck bolster is made up of the two electric motors 8 which are rigidly secured together side by side, and two tubular extensions 18 that are bolted or otherwise rigidly secured one to the outside face of each motor. The motors are preferably secured together by strap members 19 in the manner shown in my Patent No. 1,805,438, dated March 12, 1931. The outer end of each motor extension 18 has a cylindrical sleeve or bushing 20 press-fitted thereon that is supported in a circular opening provided therefor in a bracket 21 riveted to the inner face of the adjacent truck side frame 1. A steel bushing 22 has a press fit in the circular opening in the bolster supporting casting bracket 21; and a sleeve 23 of rubber or analogous material is interposed between said bushing and the bushing 20 on the outer end of the motor extension 18. The rubber sleeve 23 is cured on or vulcanized to both the bushing 22 on the side truck frame 1 and the bushing 20 on the motor extension 18. By this arrangement, the rubber sleeves 23 constitute connections between the ends of the truck bolster A and the respective truck side frames 1 which serve to prevent vertical and horizontal shocks from being transmitted from said side frames to said bolster. Said rubber sleeves also serve to yieldably resist the tendency of the bolster to rotate; and they also permit the bolster to tilt when one truck side frame is raised higher than the other and to cock slightly in the event that the truck frame goes out-of-square.

Shocks are prevented from being transmitted from the journal boxes to the truck side frames by means of blocks 24 of rubber or analogous material interposed between the journal boxes 5 and the end portions of the truck side frames 1. Extending lengthwise of each rubber cushioning block 24 is a metal angle 25, one flange of which rests upon the top of said block and has a depending longitudinal rib 26 that fits within a longitudinal groove provided therefor in the top of said block. Metal angles 27 also extend longitudinally of each rubber block 24 adjacent to the lower side edges thereof with one flange extending inwardly beneath said block and with the other flange extending upwardly along the side thereof. The rubber block is securely fastened to the upper angle 25 and to the lower angles 27 preferably by vulcanizing or curing it to the ribbed lower flange of said upper angle and to both flanges of the two lower angles, no other means being needed for securing said block and angles together. As shown in the drawings, the rubber block is grooved on its underside to increase its flexibility; and the top and bottom angles have their ends extended beyond the ends of said block and perforated to receive fastening members. The replaceable unit formed by the block and angles is interposed between a journal box and the portion of the side frame located thereabove, with the top angle 25 fitting the lower outer corner of the side frame and with the lower angles resting upon a seat 28 provided therefor on the top of the journal box. Bolts 29 secure the upstanding flange of the top angle to the web of the side frame; and bolts 30 secure the ends of the bottom flange of said angle to the bottom flange of said side frame. Rivets 31 secure the ends of the bottom flanges of the lower angles to the seat 28 on the journal box. By this arrangement, the rubber blocks serve to cushion both lateral and vertical shocks and prevent them from being transmitted to the truck side frame, and they also permit the axles to tilt endwise and to move towards and away from each other and in the direction of their axes in accommodating themselves to the track.

By the arrangement described, shocks caused by the truck riding over an uneven road bed, by suddenly changing direction of motion and by rounding a curve, are absorbed without being transmitted to the truck frame, thereby causing less wear and deterioration to the running gear and generally improved riding qualities and increased economy of operation. The hereinabove described arrangement also permits the truck bolster to tilt and shift endwise in accommodating itself to distortion of the truck frame; it also resists the tendency for the bolster to rotate on its axis; it also yieldably resists the driving and braking torque in the gear housing; it also dispenses with the use of metallic springs; and it also serves to maintain the car body at substantially the same level under all loads.

In the modified construction shown in Sheet 4 of the accompanying drawings, the journal boxes 5a at the corresponding ends of the axles 3a are connected by a truck side frome 1a of the arch bar type, wherein the adjacent ends of the top and bottom arch bars 32 and 33 are riveted together flatwise and overhang the journal boxes. The two arch bars of the truck side frame are spaced apart at the middle thereof by means of suitable strut members 34. The truck bolster comprises individual motors 8a that are united together and operatively connected to the respective axles 3a in the manner hereinbefore described; and each end portion of said bolster is formed with an outstanding bracket 35 that projects from the outer side of the motor housing and overhangs the middle portion of the truck side frame.

The ends of the truck side frame 1a are yieldably secured to the journal boxes 5a by means of members 24a of rubber or analogous material that serve to prevent shocks from being transmitted from said journal boxes to said truck side frame. Each of the rubber members 24a is interposed between metallic plates 25a and 27a secured respectively to the underside of each end portion of the truck side frame and to a seat 28a on the top of each adjacent journal box. As shown in the drawings, the top plate 25a is secured to the frame by rivets 30a; and the bottom plate 27a is secured to the seat 28a on the journal box by means of bolts 31a. Each of the rubber cushioning and connecting elements 24a is preferably made in the form of a continuous open band having spaced parallel sides and curved end portions. The rubber band 24a fits around a continuous flange 26a that depends from the top plate 25a; and the bottom plate 27a has a continuous upstanding flange 27b thereon that surrounds said band and forms a seat therefor. The rubber band is securely fastened to the top and bottom plates 25a and 27a by vulcanizing or curing said band to the underside of the top plate and to the depending flange 26a thereof and to the top of the bottom plate and to the upstanding flange 27b thereof. The bottom plate 27a is provided with a central opening for the purpose of reducing the weight of said plate; and said plate is also made of duplicate half sections to facilitate assembling.

The end of the bolster is yieldably secured to the truck side frame 1a by means of a member 23a of rubber or analogous material that serves to prevent shocks from being transmitted from said truck side frame to said bolster. The rubber securing and cushioning member 23a preferably comprises an open band interposed between a plate 20a secured to the underside of the bolster and a plate 22a secured to the top of the truck side frame. The rubber band 23a rests on the bottom plate 22a and fits around a continuous upstanding flange 22b on said plate; and the upper plate 20a is supported on said band and has an endless depending flange 20b that fits around the upper portion of said band. The rubber band 23a is fastened to the top and bottom plates 20a and 22a by vulcanizing or curing said band to the underside of the top plate and to the inner face of the depending flange 20b thereof and by curing or vulcanizing the lower portion of said band to the top of the bottom plate and to the inner face of the upstanding flange 22b thereon. The top plate 20a is preferably cut away inside of the band in order to reduce the weight of said plate. The top plate is secured to the bolster by bolts 20c; and the bottom plate is secured to the truck side frame by rivets 22c.

With the modified arrangement described, shocks are prevented from being transmitted from the journal boxes to the truck side frame and from the latter to the bolster by means of the rubber bands which constitute the sole means for connecting the bolster and journal boxes to the truck side frames. These rubber bands also serve to permit bodily movement of the bolster and journal boxes with relation to the truck side frame; and they also tend to bring the parts back to their normal positions.

While I have described the invention as an improvement in car trucks, it is obvious that the invention is equally applicable to trucks for automobiles, in which case automotive driving axles are substituted for the axles and journal boxes shown. Obviously, the hereinbefore described construction admits of considerable variation without departing from the invention.

What I claim is:

1. A truck comprising wheeled axles, members surrounding said axles, side frames extending from axle to axle, and rubber cushioning members interposed between said side frames and the members surrounding said axles, said rubber members being cured to the parts between which they are interposed, one of said parts having a recess therein adapted to form a seat for the rubber member cooperating therewith and the other part having a rib thereon adapted to seat within a recess provided therefor in said rubber member.

2. A truck comprising wheeled axles, members surrounding said axles, side frames extending from axle to axle, and cushioning elements interposed between said members and said side frames, each of said elements comprising a yielding non-metallic member, and metallic plates fastened to the top and bottom of said yielding non-metallic member and secured respectively to said side frames and the members surrounding said axles, one of said metallic plates having a rib thereon adapted to fit within a recess provided therefor in said yielding non-metallic member.

3. A truck comprising wheeled axles, journal boxes for the ends of said axles, side frames extending from journal box to journal box at the corresponding ends of said axles, continuous rubber cushioning bands interposed between said journal boxes and said side frames, and metal members secured respectively to said journal boxes and said side truck frames above and below each of said rubber cushioning bands, said rubber cushioning bands being cured to said plates, one of said plates having a portion fitting within the band cooperating therewith and the other plate having a flange surrounding said band.

4. A truck comprising wheeled axles, journal boxes for said axles, side frames extending from axle to axle with their ends overhanging said journal boxes, rubber cushioning members interposed between said journal boxes and the overhanging ends of said side frames, and sets of metal members secured to said journal boxes and said side frames one above and the other below said rubber cushioning members therebetween, said rubber cushioning members being cured to said metal members, one metal member of each set being provided with a rib adapted to seat within a recess in the cushioning member cooperating therewith.

5. A truck comprising wheeled axles, journal boxes for said axles, side frames extending from axle to axle with their ends overhanging said journal boxes, and cushioning elements interposed between said journal boxes and the overhanging ends of said side frames, each of said cushioning elements comprising a block of rubber, metal members located above and below said block of rubber, the uppermost metal member having a depending rib adapted to seat within a groove provided therefor in said block of rubber, said block of rubber being cured to said metal members, and means for securing the uppermost metal members of said cushioning elements to the side frames and the lowermost metal members of said cushioning elements to the journal boxes.

6. A truck comprising wheeled axles, side frames connecting said axles, a member extending from side frame to side frame intermediate said axles, supports on said side frames for the ends of said member, and rubber cushioning members interposed between the ends of said member and the supports therefor, said rubber cushioning members being cured to the ends of said member and to the supports therefor.

7. A truck comprising wheeled axles, side frames connecting said axles, a member extending from side frame to side frame intermediate said axles, said member having cylindrical end portions and said side frames having cylindrical recesses adapted to receive the cylindrical end portions of said member, and non-metallic cushioning sleeves interposed between the cylindrical ends of said members and the cylindrical supporting recesses therefor.

8. A truck comprising wheeled axles, side frames connecting said axles, a member extending from side frame to side frame intermediate said axles, said member having cylindrical end portions and said side frames having cylindrical recesses adapted to receive the cylindrical end portions of said member, and rubber sleeves interposed between the cylindrical ends of said members and the cylindrical supporting recesses therefor, said rubber sleeves being cured to said ends of said member and to the walls of the supporting recesses therefor.

9. A truck comprising wheeled axles, side frame members connecting said axles, a bolster extending from side frame to side frame intermediate said axles, said bolster comprising individual motors rigidly united together and operatively connected respectively to said axles to actuate the same, extensions secured to said motors, members secured to said side frames and having recesses adapted to receive the ends of said extensions, bushings rigidly secured to the ends of said extensions, bushings rigidly secured in the recesses for the ends of said extensions, and rubber sleeves interposed between the bushings on said extensions and the bushings in said recesses.

10. A truck comprising wheeled axles, side frame members extending from axle to axle, journal boxes for said axles, rubber cushioning members interposed between said journal boxes and said side frames, said rubber cushioning members being cured to the adjacent parts of said journal boxes and said side frames, a bolster extending from side frame to side frame intermediate said axles, said bolster comprising motors having individual housings rigidly united together and operatively connected respectively to said axles to actuate the same, extensions secured to said motors, members secured to said side frames and having recesses adapted to receive the ends of said extensions, bushings rigidly secured to the ends of said extensions, bushings rigidly secured in the recesses for the ends of said extensions, and rubber sleeves interposed between and cured to the bushings on said extensions and the bushings in said recesses.

11. A truck comprising wheeled axles, side frame members extending from axle to axle, journal boxes for said axles, rubber cushioning member interposed between said journal boxes and said side frames, said rubber cushioning members being cured to the adjacent parts of said journal boxes and said side frames, a bolster extending from side frame to side frame intermediate between said axles, extensions secured to said motors, members secured to said side frames and having recesses adapted to receive the ends of said bolster, bushings rigidly secured to the ends of said bolster, bushings rigidly secured in the recesses for the ends of said bolster, and rubber sleeves interposed between and cured to the bushings on said bolster and the bushings in said recesses.

12. A truck comprising wheeled axles, side frame members connecting said axles, a bolster extending from side frame to side frame intermediate between said axles, members secured to said side frames and having recesses adapted to receive the ends of said bolster, bushings press-fitted on the ends of said bolster, bushings press-fitted in the recesses for the ends of said bolster, and rubber sleeves interposed between and cured to the bushings on said bolster and the bushings in said recesses.

13. A truck comprising side frames, a member extending from side frame to side frame, and rubber cushioning members interposed between said side frames and said member, said rubber members being cured to the parts between which they are interposed, each of said rubber members comprising an elongated endless band.

14. A truck comprising wheeled axles, journal boxes for the ends of said axles, side frames extending from journal box to journal box at the corresponding ends of said axles, and cushioning elements interposed between said journal boxes and said side frames, each of said elements comprising a band of rubber, and metallic plates located above and below said band and secured respectively to a side frame and an adjacent journal box, said band being cured to said plates.

15. A truck comprising wheeled axles, journal boxes for the ends of said axles, side frames extending from journal box to journal box at the corresponding ends of said axles and cushioning elements interposed between said journal boxes and said side frames, each of said elements comprising a band of rubber, and metallic plates located above and below said band and secured respectively to a side frame and an adjacent journal box, said band being cured to said plates, one of said plates having a portion surrounding said band and the other of said plates having a portion fitting within said band.

16. A truck comprising side frames, a bolster extending from side frame to side frame, and cushioning elements interposed between said side frames and said bolster, each of said elements comprising a band of rubber, and metallic plates secured respectively to said bolster and to a side frame, said band of rubber being cured to said plates, one of said plates having a portion surrounding said band of rubber and the other of said plates having a portion fitting within said band of rubber.

17. In a car truck, a side frame, a bolster, a projection extending from said bolster, and means comprising a rubber element surrounding said projection for cushion-movements of said bolster with respect to said side frame.

18. In a car truck, a bolster member, a bolster supporting member, a projection extending from one of said members, the other of said members having a chamber receiving said projection, and rubber means in said chamber subjected to shearing stress in cooperating with said projection upon movement of the bolster in either of directions at right angles to each other.

19. In a car truck, a bolster member, a bolster supporting member, a projection extending from one of said members, the other of said members having a chamber receiving said projection, a rubber element in said chamber, a member to which said element is attached and engaging interior portions of said chamber, and another member to which said element is attached and cooperating with said projection for subjecting said rubber element to shearing stress upon relative movement between said bolster and said bolster supporting member.

20. In a car truck, a bolster, a truck frame member, said bolster having a cylindrical end portion, and means comprising a rubber element surrounding said cylindrical end portion and cooperating with said bolster and frame member for cushioning thrusts of the bolster transversely of its longitudinal axis.

21. In a car truck, a bolster, a truck frame member, said bolster having a cylindrical end portion, and means comprising a rubber element and other elements on opposite sides thereof and mounted on said cylindrical end portion for cooperating with said frame member and bolster to cushion thrusts of the bolster transversely of the longitudinal axis thereof.

22. In a car truck, a side frame, a bolster, a rubber block of annular formation mounted in said side frame, a sleeve element in said block, and means projecting from said bolster into engagement with said sleeve element whereby the bolster is resiliently supported by said rubber block.

23. In a car truck, a bolster, a bolster supporting member, and rubber means cooperating with said bolster and supporting member for supporting the bolster and enabling relative movement between the truck and bolster about the longitudinal axis of the latter.

24. In a car truck, a side frame, a bolster rubber means cooperating with said bolster and side frame, and means cooperating with said rubber means for placing a portion thereof under compression and simultaneously tensioning another portion of said rubber means upon movement of said bolster with respect to said side frame.

25. In a car truck, a side frame, a bolster, rubber means cooperating with said bolster and side frame, and means cooperating with said rubber means for placing a portion thereof under compression and simultaneously tensioning another portion of said rubber means upon movement of said bolster with respect to said side frame in either of a plurality of directions at an angle to each other.

26. In a car truck, a bolster, a side frame, a pocket on one of said members, a projection movable with the other of said members, a sleeve surrounding said projection, a sleeve mounted in said pocket, and means comprising a rubber block secured to said sleeves for resisting movement of the bolster with respect to the side frame through compression of a portion of said block and simultaneous tensioning of another portion thereof.

NELSON R. BROWNYER.